United States Patent [19]
Ohta et al.

[11] Patent Number: 5,046,542
[45] Date of Patent: Sep. 10, 1991

[54] RADIAL TIRES FOR CONSTRUCTION VEHICLES INCLUDING TREAD CAP AND DIVIDED TREAD BASE

[75] Inventors: Yasushi Ohta, Kodaira; Junichi Otsuka, Higashikurume, both of Japan

[73] Assignee: Bridgestone Corporation, Tokyo, Japan

[21] Appl. No.: 481,653

[22] Filed: Feb. 14, 1990

Related U.S. Application Data

[63] Continuation of Ser. No. 232,749, Aug. 16, 1988, abandoned.

[30] Foreign Application Priority Data

Aug. 20, 1987 [JP] Japan .................. 62-204974

[51] Int. Cl.$^5$ .................. B60C 9/18; B60C 11/00
[52] U.S. Cl. .................. 152/209 R; 152/532
[58] Field of Search .............. 152/209 R, 209 D, 538, 152/537, 532

[56] References Cited

U.S. PATENT DOCUMENTS

| | | | |
|---|---|---|---|
| 4,425,953 | 1/1984 | Rohde et al. | 152/538 X |
| 4,580,608 | 4/1986 | Rampl | 152/209 R |

FOREIGN PATENT DOCUMENTS

| | | | |
|---|---|---|---|
| 49-80703 | 8/1974 | Japan . | |
| 56-79004 | 6/1981 | Japan | 152/209 R |
| 56-146405 | 11/1981 | Japan | 152/209 R |
| 60-15203 | 1/1985 | Japan | 152/209 R |
| 61-287802 | 12/1986 | Japan . | |

*Primary Examiner*—Geoffrey L. Knable
*Attorney, Agent, or Firm*—Sughrue, Mion, Zinn, Macpeak & Seas

[57] ABSTRACT

A radial tire for use in construction vehicles comprises a tread of a two layer structure composed of tread cap rubber and tread base rubber. In this case, the tread base rubber is divided into crown center portion and shoulder portion, and these rubbers satisfy particular relations of loss factor at 50° C., storage modulus at 50° C. and 300% modulus at room temperature.

4 Claims, 1 Drawing Sheet

FIG_1
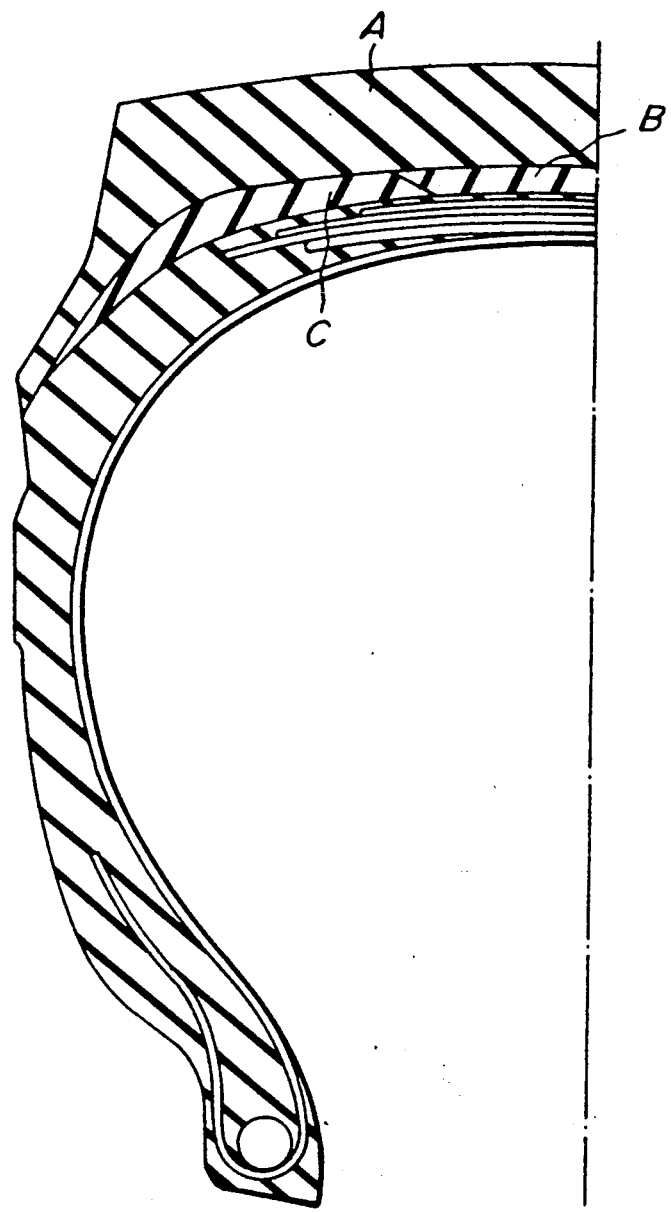
FIG_2
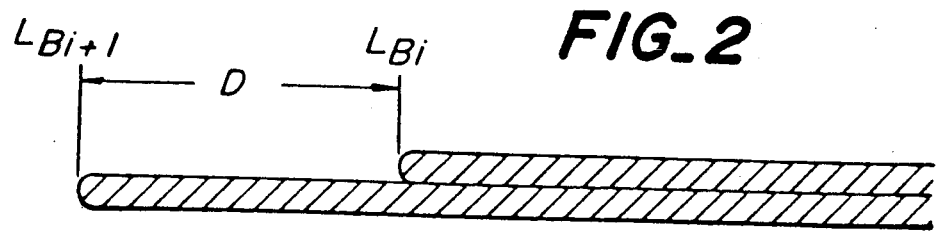

RADIAL TIRES FOR CONSTRUCTION VEHICLES INCLUDING TREAD CAP AND DIVIDED TREAD BASE

This is a continuation of application Ser. No. 07/232,749, filed Aug. 16, 1988, and abandoned.

BACKGROUND OF THE INVENTION

1. Field of the Invention

This invention relates to radial tires for construction vehicles which largely suppress the crack growth from tread cut failure produced in a belt end to considerably improve the durable life without damaging cut resistance and heat generating durability.

2. Related Art Statement

In general, tires for construction vehicles mainly running on rough roads have a problem that cracks propagate up to a belt end portion due to the increase of strain under an authorized payload also, a heat build-up problem is based on the thickness profile of tire itself and tread cut failure at stone pit and consequently separation failure is caused from the belt end to largely degrade the durable life.

As a technique for solving the above problem, Japanese Patent laid open No. 49-80,703 proposes that two or more different rubber materials having a low heat build-up are arranged side by side in the widthwise direction of the tire so as to match with a deformation system of crown portion and shoulder portion of base rubber during the running for reducing internal heat generation.

Furthermore, Japanese Patent laid open No. 61-287,802 proposes a radial tire having a two layer structure of a tread composed of cap rubber and base rubber, wherein a rubber composition having a good impact cut resistance is used in the center portion of the crown of the base rubber and a rubber composition having a low heat build-up is used in the shoulder portion of the base rubber to thereby differ rubber properties as a tread rubber in the cap rubber and the base rubber at its crown and shoulder portions.

In the technique of Japanese Patent laid open No. 49-80,703, however, the considerable effect of suppressing the heat build-up of the tire is observed by rendering the base rubber into the above moving shape, but since the rubber used is substantially low in heat build-up, the cut resistance is poor so that when cut failure is caused at the tread, there is caused a problem that cracks propagate up to the belt end to finally cause separation failure at belt end.

On the other hand, when the technique of Japanese Patent laid open No. 61-287,802 is applied to the tire for a construction vehicle aiming at the invention, the heat generation level in the central portion of the tread base rubber is high, which comes into problem in view of the heat generating durability, and also since the shoulder portion of the tread base rubber is substantially a low heat build-up rubber, the resistance to crack growth is poor and the cracks are apt to propagate up to the belt end when cut failure is caused in the tread and finally the separation failure at belt end is caused to largely reduce the durable life.

As seen from the above, the aforementioned problems in the tire for construction vehicle can not sufficiently be solved by the above conventional techniques.

SUMMARY OF THE INVENTION

It is, therefore, an object of the invention to provide a technique of considerably improving the durable life of the tire for a construction vehicle by largely suppressing the crack growth from the belt end due to the cut failure of the tread without damaging the cut resistance and heat generating durability.

The inventors have made studies in order to solve the technical problems of the conventional technique and found that the object of the invention can be achieved by adopting a two layer structure in the tread of the tire for a construction vehicle, dividing the base rubber into a shoulder portion and a crown center portion and optimizing rubber properties of base rubber of these portions and tread cap rubber in connection with problem inherent to the construction tire, and as a result the invention has been accomplished.

According to the invention, there is the provision of a radial tire for construction vehicles comprising a casing reinforcement consisting of a carcass of radial structure and a belt surrounding an outer periphery of a crown portion of said carcass and having a tread of a two layer structure composed of a tread base rubber covering an outer portion in the radial direction of said belt and both side portions in widthwise direction of the tire and a tread cap rubber (A) arranged outside said tread base rubber in the radial direction, characterized in that said tread base rubber consists of a tread base rubber (B) at crown center portion arranged outside said belt in the radial direction and a tread base rubber (C) at shoulder portion arranged in both sides of said crown center portion in the widthwise direction of the tire and covering at least a belt end, and said tread base and cap rubbers satisfy the following relations:

$$\tan\delta(B) < \tan\delta(C) < \tan\delta(A) \qquad (1a)$$

$$\tan\delta(C) - \tan\delta(B) \geqq 0.02 \qquad (1b)$$

(where $\tan\delta$ (A), $\tan\delta$ (B) and $\tan\delta$ (C) are loss factors at 50° C. of the rubbers (A), (B) and (C), respectively);

$$E'(A) > E'(C) > E'(B) \qquad (2a)$$

$$E'(C) - E'(B) \geqq 5.0 \times 10^6 \; (dyn/cm^2) \qquad (2b)$$

(where E'(A), E'(B) and E'(C) are storage moduli of elasticity at 50° C. of the rubbers (A), (B) and (C), respectively); and $$15 \times 10^{-7} \geqq M_{300}(B)/E'(B) - M_{300}(C)/E'(C) \geqq 2 \times 10^{-7} \; (kg/dyn) \qquad (3)$$

(where $M_{300}(B)$ and $M_{300}(C)$ are 300% moduli at room temperature of the rubbers (B) and (C), respectively).

BRIEF DESCRIPTION OF THE DRAWINGS

The invention will be described with reference to the accompanying drawings, wherein:

FIG. 1 is a partially sectional view of an embodiment of the radial tire for construction vehicles according to the invention; and FIG. 2 is a partially sectional view of the belt cord used for illustrating an outline of a test for resistance to crack growth at belt end.

DESCRIPTION OF THE PREFERRED EMBODIMENTS

According to the invention, it is required to arrange the tread base rubber so as to cover the belt end portion with the tread base rubber (C) for the shoulder portion as shown in FIG. 1 because when the rubber (C) is not arranged in the above arrangement but the rubber (B) is arranged in this arrangement, if the cut failure is caused from the tread, since the outermost end of the belt is not covered with rubber having good cut resistance and resistance to crack growth, cracks invades into the belt to undesirably cause the belt troubles.

As illustrated in FIG. 1 the tread cap rubber (A) extends in the tire widthwise direction to radially cover both of the base rubbers (B) and (C). The tread cap rubber (A) overlies and extends laterally beyond a laterally outer end of the tread base rubber (C). FIG. 1 also, illustrates a belt structure with a plurality of belt layers with portions of the belt layers laterally outside the base rubber (B). The tread cap (A) and the tread base rubber (C) taper radially inward toward a shoulder portion of the tire and the tread cap rubber (A) overlies and extends laterally beyond a laterally outer end of the base rubber (C) in the shoulder portion.

Furthermore, according to the invention, it is required that the each tan δ value at 50° C. in the cap rubber (A) and the base rubbers (B) and (C) satisfy the relations of the above formulae (1a) and (1b). Because, when these relations are not satisfied, the function allotment of the rubber (B) making much of heat generation resistance and the rubber (C) making much of cut resistance is not sufficiently conducted and the object of the invention can not be achieved.

Similarly, when each of storage modulus of elasticity $E'$ at 50° C. and 300% modulus $M_{300}$ at room temperature in the rubbers (A), (B) and (C) does not satisfy the relations of the above formulae (2a), (2b) and (3), the balance among the cut resistance of the rubber (C) and other performances is not desirably maintained. Particularly, when the value of $M_{300}/E'$ is not within the given range as a difference between the rubber (B) and the rubber (C), the object of the invention can not be achieved. That is, when this difference is smaller than $2 \times 10^{-7}$ kg/dyn, the effect of establishing the resistance to crack growth and the cut resistance is not obtained, while when it exceeds $15 \times 10^{-7}$ kg/dyn, the cut resistance and the resistance to crack growth of the rubber (B) are degraded, which is considerably disadvantageous in view of the durability of the tire.

As mentioned above, according to the invention, there are noticed troubles inherent to the construction tire, and the rubber properties in the tread cap rubber and tread base rubbers for the crown center portion and shoulder portion are related to each other, whereby the object of the invention is first achieved.

The following examples are given in illustration of the invention and are not intended as limitations thereof.

Various radial tires for construction vehicles having a tire size of ORR24.00 R49 were manufactured by applying a rubber composition having a compounding recipe (parts by weight) shown in the following Table 1 to a tread cap and applying a rubber composition having a compounding recipe (parts by weight) shown in the following Table 2 to crown center portion and shoulder portion of tread base.

Moreover, the rubber composition at the crown center portion in Example 1 and Comparative Example 5 of Table 2 was same, and also the rubber composition at the shoulder portion in Example 2 was the same as at the crown center portion in Comparative Example 4.

TABLE 1

| Tread cap rubber composition | |
|---|---|
| Compounding ingredient | Compounding recipe (parts by weight) |
| Styrene-butadiene rubber | 100 |
| Carbon black ISAF *1 | 60 |
| ZnO | 2.5 |
| Vulcanization accelerator *2 | 0.4 |
| Vulcanization accelerator *3 | 0.8 |
| Antioxidant *4 | 1.0 |
| Sulfur | 1.5 |

*1 DBP absorption: 116 ml/100 g, N₂SA value: 117 m²/g, IA value: 121 mg/g
*2 Soxinol CZ (trade name of N-cyclohexyl-2-benzothiazyl sulfeneamide, Sumitomo Chemicals Co., Ltd.)
*3 Soxinol D (trade name of diphenylguanidine, Sumitomo Chemicals Co., Ltd.)
*4 Santoflex 13 (trade name of N-(1,3-dimethylbutyl)-N'-phenyl-p-phenylenediamine, Mitsubishi Monsanto Chemicals Company)

TABLE 2

| | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Tread base rubber composition | | | | | | | | |
| Rubber in crown center portion | | | | | | | | |
| natural rubber | 100 | 100 | 100 | 100 | 100 | 100 | 100 | 100 |
| carbon black Li-HAF *1 | 40 | 40 | 40 | 42 | 38 | 32 | 37 *7 | 40 |
| ZnO | 3.5 | 3.5 | 4.0 | 3.5 | 3.5 | 3.5 | 3.5 | 3.5 |
| vulcanization accelerator *2 | 1.0 | 1.0 | 1.0 | 1.0 | 1.5 | 1.2 | 1.0 | 1.1 |
| antioxidant *3 | 1.0 | 1.0 | 1.0 | 1.0 | 1.0 | 2.0 | 0.2 *8 | 1.0 |
| sulfur | 2.0 | 2.0 | 2.0 | 1.8 | 3.5 | 3.5 | 2.0 | 2.0 |
| Rubber in shoulder portion | | | | | | | | |
| natural rubber | 100 | 100 | 100 | 100 | 100 | 100 | 100 | 100 |
| carbon black *4 | 40 | 37 | 32 | 32 | 32 | 32 | 40 *9 | 40 *9 |
| ZnO | 3.5 | 3.5 | 3.5 | 3.5 | 3.5 | 3.5 | 3.5 | 3.5 |
| vulcanization accelerator *5 | 1.0 | 1.0 | 1.2 | 1.2 | 1.2 | 1.2 | 1.1 | 1.1 |
| antioxidant *6 | 0.8 | 0.8 | 0.8 | 0.8 | 0.8 | 0.8 | 1.0 *10 | 1.0 *10 |

TABLE 2-continued

| | | | | Tread base rubber composition | | | | |
|---|---|---|---|---|---|---|---|---|
| | Example 1 | Example 2 | Example 3 | Comparative Example 1 | Comparative Example 2 | Comparative Example 3 | Comparative Example 4 | Comparative Example 5 |
| sulfur | 1.5 | 2.0 | 2.7 | 2.7 | 2.7 | 2.7 | 2.0 | 2.0 |

*1 DBP absorption: 104 ml/100 g, $N_2SA$ value: 71 $m^2/g$, IA value: 68 mg/g
*2 Soxinol CZ (trade name, Sumitomo Chemicals Co., Ltd.)
*3 Nocrac 810NA (trade name of N-phenyl-N'-isopropyl-p-phenylenediamine, Ohuchi Shinko Kagaku K.K.)
*4 DBP absorption: 93 ml/100 g, $N_2SA$ value: 131 $m^2/g$, IA value: 132 mg/g
*5 Soxinol CZ (trade name, Sumitomo Chemicals Co., Ltd.)
*6 Antigen RD (trade name of polymerized 2,2,4-trimethyl-1,2-dihydroquinoline, Sumitomo Chemicals Co., Ltd.)
*7 use of carbon black *4
*8 use of Antigen RD as an antioxidant
*9 use of carbon black Li-HAF
*10 use of Nocrac 810NA as an antioxidant As regards the above test tires, the measurement of the properties as shown in Table 3 and the tests of tire performances were carried out by the following methods.

The thus obtained results are shown in the following Table 3.

Storage modulus E' and loss factor tan δ

E' and tan δ were measured by using a viscoelastic spectrometer made by Iwamoto Seisakusho under conditions that the frequency was 50 Hz, the temperature was 50° C. and the gravity strain was 1%.

Modulus $M_{300}$

The modulus at 300% elongation was measured at room temperature according to a tensile test method of JIS K6301.

Heat generating durability

The durability was evaluated according to a drum test method of JIS D4230 and represented according to the following equation by an index on the basis that the running distance of the control was 100:

$$(\text{index}) = \frac{\text{running distance of test tire}}{\text{running distance of control tire}} \times 100$$

The larger the index value, the better the property.

Cut resistance

After the test tire was run an a rough road for about 2 weeks, the tread was peeled off to expose the belt and the number of cuts arriving at the belt was measured, from which the cut resistance was evaluated according to the following standards:

| | |
|---|---|
| Cut number of not less than 30 | 1 |
| Cut number of not less than 20 but less than 30 | 2 |
| Cut number of not less than 10 but less than 20 | 3 |
| Cut number of not less than 2 but less than 10 | 4 |
| Cut number of less than 2 | 5 |

The larger the numerical value, the better the property.

Resistance to crack growth at belt end

In the above test tire evaluating the cut resistance, after the cut arrived at the tread base shoulder portion, the state of growing cracks up to the belt end was evaluated between the adjoining belt layers $(L_{Bi}-L_{Bi+1})$ shown in FIG. 2 as follows. That is, when a distance of $L_{Bi+1}-L_{Bi}$ in the radial direction of the tire is D, the length of crack from either $L_{Bi+1}$ or $L_{Bi}$ was quantitatively evaluated at the following five stages:

| | |
|---|---|
| length of not less than 50% | 1 |
| length within a range of 25~50% | 2 |
| length within a range of 10~25% | 3 |
| length within a range of 0~10% | 4 |
| zero | 5 |

The larger the value, the better the property.
Moreover, the stage 1 means that the durable life of the tire is substantially completed.

TABLE 3

| | Example 1 | Example 2 | Example 3 | Comparative example 1 | Comparative example 2 | Comparative example 3 | Comparative example 4 | Comparative example 5 |
|---|---|---|---|---|---|---|---|---|
| tread cap rubber (A) | | | | | | | | |
| tan δ(A) | 0.18 | 0.18 | 0.18 | 0.18 | 0.18 | 0.18 | 0.18 | 0.18 |
| E'(A) (× $10^7$ dyn/cm$^2$) | 12.0 | 12.0 | 12.0 | 12.0 | 12.0 | 12.0 | 12.0 | 12.0 |
| tread base rubber | | | | | | | | |
| rubber (B) in crown center portion | | | | | | | | |
| tan δ(B) | 0.07 | 0.07 | 0.07 | 0.110 | 0.065 | 0.055 | 0.110 | 0.07 |
| E'(B) (× $10^7$ dyn/cm$^2$) | 6.0 | 6.0 | 6.2 | 6.0 | 8.2 | 4.0 | 8.0 | 6.0 |
| $M_{300}$(B)/E'(B) (× $10^{-7}$ kg/dyn) | 31.0 | 30.0 | 29.0 | 30.0 | 31.0 | 50.0 | 20.0 | 30.0 |
| rubber (C) in shoulder portion | | | | | | | | |
| tan δ(C) | 0.15 | 0.11 | 0.095 | 0.095 | 0.095 | 0.095 | 0.07 | 0.07 |
| E'(C) (× $10^7$ dyn/cm$^2$) | 9.5 | 8.0 | 7.2 | 7.2 | 7.2 | 7.2 | 6.0 | 6.0 |
| $M_{300}$(C)/E'(C) (× $10^{-7}$ kg/dyn) | 16.0 | 20.0 | 24.0 | 24.0 | 24.0 | 24.0 | 30.0 | 30.0 |
| tan δ(C)-tan δ(B) | 0.08 | 0.04 | 0.025 | −0.015 | 0.03 | 0.04 | −0.04 | 0 |
| E'(C)-E'(B) (× $10^7$ dyn/cm$^2$) | 3.5 | 2.0 | 1.0 | 1.2 | −1.0 | 3.2 | −2.0 | 0 |
| $M_{300}$(B)/E'(B)-$M_{300}$(C)/E'(C) (× $10^{-7}$ kg/dyn) | 15.0 | 10.0 | 5.0 | 6.0 | 7.0 | 26.0 | −10.0 | 0 |
| Cut resistance | 5 | 4 | 3~4 | 3~4 | 3 | 2 | 4 | 3 |
| Heat generating durability | 95 | 100 | 100 | 75 | 115 | 120 | 80 | 100 |

TABLE 3-continued

|  | Example 1 | Example 2 | Example 3 | Comparative example 1 | Comparative example 2 | Comparative example 3 | Comparative example 4 | Comparative example 5 |
| --- | --- | --- | --- | --- | --- | --- | --- | --- |
| Resistance to crack growth at belt end | 5 | 5 | 4 | 3 | 3~4 | 2 | 1 | 3 |

As seen from Table 3, when the relations among the rubber properties in the tread cap rubber, tread base rubber in the shoulder portion and tread base rubber in the crown center portion satisfy the conditions defined in the invention, the resistance to crack growth at belt end in the radial tire for construction vehicle is improved without damaging the cut resistance and the heat generating durability, and consequently the durable life of the tire is largely increased.

What is claimed is:

1. A radial tire for construction vehicles comprising; a casing reinforcement consisting of a carcass of radial structure and a belt surrounding an outer periphery of a crown portion of said carcass and having a tread of a two layer structure composed of a tread base rubber covering an outer portion in radial direction of said belt and both side portions in widthwise direction of the tire and a tread cap rubber (A) arranged outside said tread base rubber in the radial direction, said tread base rubber consists of a first tread base rubber (B) at crown center portion arranged outside said belt in the radial direction and a second tread base rubber (C) at tire shoulder portions arranged at both sides of said crown center portion first tread base rubber in the widthwise direction of the tire and radially outside said belt, said second tread base rubber superimposed over at least a belt end, said tread cap rubber (A) extends in said tire widthwise directions to radially cover both said first and second tread base rubbers and said tread base and cap rubbers satisfy the following relations:

$$\tan\delta(B) < \tan\delta(C) < \tan\delta(A) \quad (1a)$$

$$\tan\delta(C) - \tan\delta(B) \geq 0.02 \quad (1b)$$

(where $\tan\delta$ (A), $\tan\delta$ (B) and $\tan\delta$ (C) are loss factors measured at 50° C., a frequency of 50 Hz and gravity strain of 1%, of the rubbers (A), (B) and (C), respectively);

$$E'(A) > E'(C) > E'(B) \quad (2a)$$

$$E'(C) - E'(B) \geq 5.0 \times 10^6 \; (dyn/cm^2) \quad (2b)$$

(where $E'(A)$, $E'(B)$ and $E'(C)$ are storage moduli of elasticity, measured at 50° C., a frequency of 50 Hz and gravity strain of 1%, of the rubbers (A), (B) and (C), respectively); and $$15 \times 10^{-7} \geq M_{300}(B)/E'(B) - M_{300}(C)/E'(C) \geq 2 \times 10^{-7} \; (kg/dyn)$$

(where $M_{300}(B)$ and $M_{300}(C)$ are 300% moduli at room temperature of the rubbers (B) and (C), respectively).

2. The radial tire of claim 1, wherein said tread cap rubber (A) overlies and extends laterally beyond a laterally outer end of said second tread base rubber (C).

3. The radial tire of claim 1, wherein said belt comprises a plurality of belt layers and portions of said layers are laterally outside said first tread base rubber (B).

4. The radial tire of claim 1, wherein both said tread cap rubber (A) and said second tread base rubber (C) taper radially inward toward a shoulder portion of said tire and said tread cap rubber (A) overlies and extends laterally beyond a laterally outer end of said second tread base rubber (C) in said shoulder portion.

* * * * *